(No Model.) 3 Sheets—Sheet 1.
J. FARMER.
MACHINE FOR MEASURING AND MARKING CLOTH.
No. 355,517. Patented Jan. 4, 1887.
FIG:1.
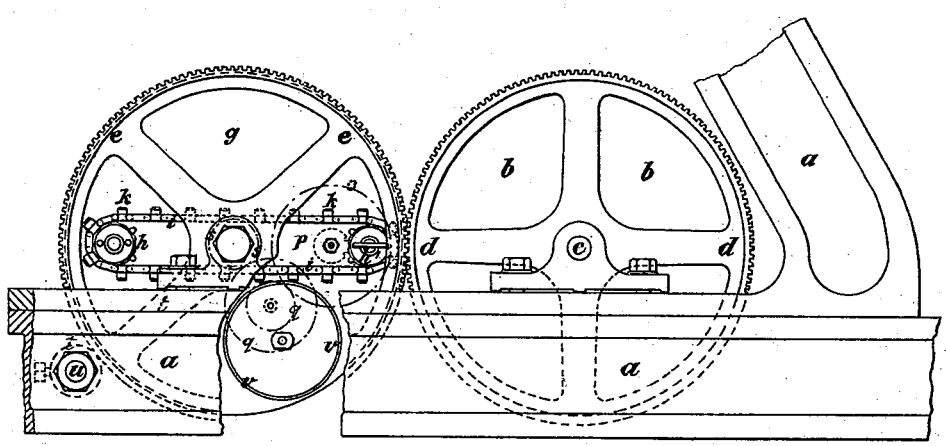
FIG:2.
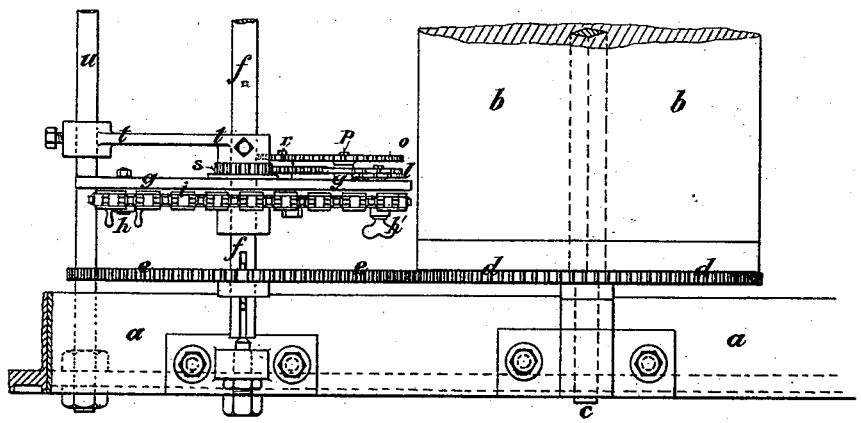
Witnesses.
Henry Bossert
Harry Drury
Inventor.
James Farmer
by his Attorneys
Hwsm &mp (No Model.) 3 Sheets—Sheet 2.
J. FARMER.
MACHINE FOR MEASURING AND MARKING CLOTH.
No. 355,517. Patented Jan. 4, 1887.
FIG. 3.
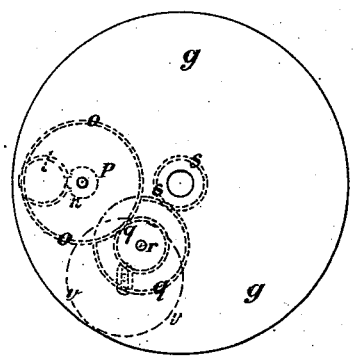
FIG. 5.
FIG. 6.
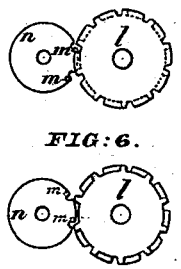
FIG. 4.
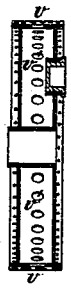
FIG. 7.
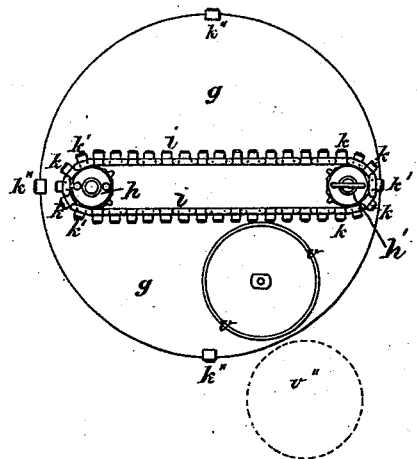
Witnesses.
Henry Bossert
Harry Drury
Inventor.
James Farmer
by his Attorneys
Howson & Son (No Model.) 3 Sheets—Sheet 3.

J. FARMER.
MACHINE FOR MEASURING AND MARKING CLOTH.

No. 355,517. Patented Jan. 4, 1887.

Witnesses.
John E. Parker
David S. Williams

Inventor.
James Farmer
by his Attorneys
Howson & Sons

UNITED STATES PATENT OFFICE.

JAMES FARMER, OF SALFORD, COUNTY OF LANCASTER, ENGLAND.

MACHINE FOR MEASURING AND MARKING CLOTH.

SPECIFICATION forming part of Letters Patent No. 355,517, dated January 4, 1887.

Application filed January 8, 1885. Serial No. 152,284. (No model.) Patented in England August 24, 1883, No. 4,102.

*To all whom it may concern:*

Be it known that I, JAMES FARMER, a subject of the Queen of Great Britain and Ireland, and residing at Salford, in the county of Lancaster, England, have invented Improvements in Machinery or Apparatus for Measuring and Marking Cloth, (for which I have obtained a patent in Great Britain, No. 4,102, dated August 24, 1883,) of which the following is a specification.

This invention is designed, principally, to print or stamp the number of yards contained in a piece of cloth at intervals of, say, five yards; but, by slight modifications, hereinafter described, the invention may also be adapted to measure single yards and quarters, and the apparatus is constructed chiefly with a view to work in conjunction with creasing and measuring machines; but it may also be made to work with other machines through which cloth is passing, if it is required to measure and mark the same into lengths.

Figure 7A:
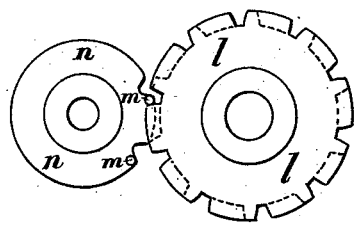
Figure 8:
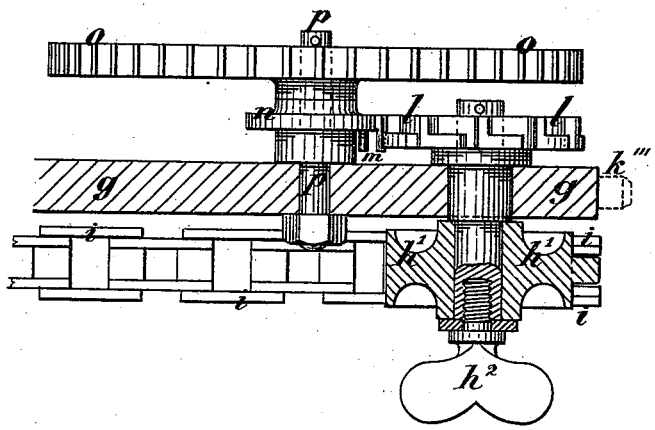

In the accompanying drawings, Figure 1, Sheet 1, is a side elevation, and Fig. 2 a plan view, of my improved marking apparatus as arranged for measuring five-yard lengths and applied to the frame of a creasing and measuring machine. Figs. 3, 4, 5, and 6, Sheet 2, represent details, hereinafter referred to. Fig. 7, Sheet 2, shows a modification of my improvement, hereinafter described, as applied to measure single yards and quarters. Fig. 7ª and Fig. 8 are views, drawn to an enlarged scale, of details of the machine.

$a\ a$ is part of the frame of the machine, and $b\ b$ is the measuring drum or cylinder round which the cloth passes. Upon the shaft $c\ c$ of this drum I mount a toothed wheel, $d\ d$. This wheel $d\ d$ gears with a similar wheel, $e\ e$, of the same diameter upon a shaft, $f\ f$, mounted in suitable bearings fixed on the frame $a\ a$ in front of the said measuring drum or cylinder $b\ b$, so that the printing-surface of a marking apparatus (hereinafter described) is caused to revolve upon this shaft $f\ f$ at the same surface-speed as the cloth which travels on the surface of the measuring-drum $b\ b$.

The marking apparatus is constructed as follows: Upon the shaft $f\ f$ above mentioned I fix a disk or plate, $g\ g$, rather less in diameter than the wheels $d$ and $e$ of the above driving-gear. This disk $g\ g$ carries two chain-pulleys, $h\ h'$, Figs. 2, 7, and 8, over which passes a chain, $i\ i$, carrying a series of, say, twenty numbered types or marking-surfaces, $k\ k$. As one of these pulleys $h\ h'$ is caused to make a part of a revolution—say a fifth—at every fifth revolution of the measuring drum or roller $b\ b$, the circumference of which is one yard, the cloth will be marked at every five yards of the piece, which marking will continue for one hundred yards without repetition. The intermittent revolution of this pulley $h'$ is effected by a star-wheel, $l\ l$, (see enlarged views, Figs. 5 and 6, Sheet 2, and 7ª and 8 on Sheet 3,) driven by a pin or pins, $m\ m$, upon a disk or plate, $n\ n$, forming part of or attached to a spur-wheel, $o\ o$, (see Figs. 3 and 8,) mounted on a stud, $p$, fixed in the disk $g\ g$, upon which the chain $i\ i$ and pulleys $h\ h'$ are carried. This spur-wheel $o\ o$ is actuated through the wheels $q\ q$, mounted upon another stud, $r\ r$, on the disk $g\ g$ and driven by a pinion, $s\ s$, mounted on the shaft $f\ f$, (upon which this disk revolves,) but not revolving with it.

In order to prevent the possibility of any one of the types $k\ k$ coming into printing position out of its due course, I construct the star-wheel $l\ l$, which drives the chain-pulley $h'$, with notches which are held by the periphery of the disk or plate $n\ n$, which carries the pin or pins $m\ m$ until the latter come round again to act on the star-wheel. Notches are also cut in the periphery of the said disk or plate $n\ n$ to allow clearance for the star-wheel when actuated by the pins $m$. (See Figs. 5, 6, 7ª, and 8.)

The wheels $o$, $q\ q$, and $s$ are so proportioned that the wheel $o\ o$, and consequently the plate $n\ n$, will make one revolution for every five of the disk $g\ g$, and as there are two pins $m$ thereon and ten recesses in the star-wheel, the latter will make one-fifth ($\frac{1}{5}$) of a revolution at every fifth revolution of the disk $g\ g$, remaining still for the intermediate four revolutions of the said disk, while the plain surface or periphery of the plate $n\ n$ works in the notches cut in one side of the wheel $l\ l$. The position of the types during these four revolutions is shown at Fig. 1. During the fifth revolution of the disk $g\ g$ the pulley $h'$ makes a fifth part of a revolution, and one of the types $k$ comes into marking position midway of its traverse, so as to mark exactly at the end of the fifth yard, and then passes out of marking position.

The chain-pulley $h'$ is so mounted on its spindle, (see Fig. 8,) as to be readily loosened therefrom by the screw $h^2$ in order to allow the types $k\ k$ to be brought back to the starting-point without disturbing the other gear-wheels when the machine is at rest.

In order to bring the types $k\ k$ into the proper position for marking the edges of various widths of cloth, the disk $g\ g$ and the pinion $s\ s$ are made to slide together upon the shaft $f\ f$ and to be adjusted thereon in any convenient manner. For this purpose I prefer to mount the pinion $s\ s$ rigidly on an arm, $t\ t$, which slides on the shaft $f\ f$, and is adjustable upon a fixed rod, $u\ u$, stretching across the machine. The pinion $s$ being rigidly secured to the arm $t$, however, cannot revolve on the shaft $f$.

An inking roller or pad, $v\ v$, is provided to supply the types with ink before they mark the cloth. I make the inking-pad, as shown in enlarged section at Fig. 4, in the form of a hollow pulley or drum, $v'\ v'$, having two rows of holes near the outside edges for the purpose of sewing on a cloth pad, $v\ v$, and a central row of holes to allow the ink in the interior of the drum to pass out and have access to the inside of the cloth pad in order to saturate the latter.

I would here remark that although I have described this apparatus when designed to mark off or measure every five yards of the cloth, I do not confine myself to this distance or number of yards, as with slight modifications the apparatus might be made to mark at other intervals either greater or less, as desired. For example, Fig. 7, Sheet 2, shows a modification for marking single yards, and quarters. The chain $i\ i$ is provided with a series of types, $k'\ k'$, placed alternately between the types $k$ thus: $k\ k'\ k\ k'\ k\ k'$, and so on. These tyes bear a device which is by preference not a numeral. A numeral would create confusion, as during four revolutions one of these types $k'$ is in marking position. At the fifth revolution the wheel $h'$ turns one-fifth, and one of the types comes into marking position at the fifth yard, and passes on, as previously explained. A fresh type $k'$ is then in position to mark the sixth, seventh, eighth, and ninth yards. Then a type $k$ comes on for the tenth, and so on, and each intermediate yard between the fives will be marked with a letter or other device thus : 0 M M M M 5, M M M M 10, M M M M 15, and so on, (supposing, for example, the types $k'$ to carry the letter M.)

If it be required to mark quarters also, the disk $g\ g$ is provided with three other types $k''\ k''\ k''$, bearing, respectively, the marks ¼ ½ ¾, and in this case a second inking roller, $v''$, will be required for the inking of these additional types $k''\ k''\ k''$. It will also be evident that the intermediate types, $k'$, may be omitted from the chain $i\ i$ and a single type, $k'''$, (bearing a letter or device, say M,) placed on the disk immediately behind the marking-point for the types $k$, as indicated in dotted lines on Fig. 8. $k''$ and $k'''$ should be fixed by screws or other removable device, so that they may be taken away when not required. $k'''$ will mark at every revolution, but as it will only mark with a letter or device no confusion will occur, thus: M ¼ ½ ¾, M ¼ ½ ¾, M ¼ ½ ¾, M ¼ ½ ¾, M ¼ ½ ¾, M ¼ ½ ¾ M, 0                                                                        5 and so on.

It is evident, also, that the measuring and marking apparatus above described may be used either by itself or in conjunction with any other machine by providing the apparatus with a drum, (similar to the drum $b\ b$,) and driving the same in a suitable manner.

Owing to the gearing of the disk $g$ with the measuring-drum $b$ by wheels $d\ e$ of the same diameter, the marking devices are caused to travel at the same surface speed as the measuring-drum, and consequently a clean impression is always insured.

I claim as my invention—

1. The combination of a revolving drum, and a disk geared thereto and carrying an endless chain of types, with wheels carrying said types, a star-wheel, $l$, and a rotary disk, $n$, controlling the star-wheel.

2. The combination of a drum, and a shaft geared thereto, with a disk adjustable longitudinally on said shaft, an endless chain of types on the face of the disk, and a fixed pinion, $s$, also adjustable on said shaft and controlling the gear to impart motion to the types, all substantially as specified.

3. The combination of a drum, and a shaft geared thereto, with a disk adjustable longitudinally on said shaft and carrying an endless chain of types, a fixed pinion, $s$, controlling the gear for the types, a rod, $w$, and an arm, $t$, adjustable on the rod and controlling the positions of the pinion and disk, substantially as set forth.

In testimony whereof I have signed my name to this specification in the presence of two subscribing witnesses.

JAS. FARMER.

Witnesses:
  CHARLES DAVIES,
  JNO. HUGHES.